United States Patent
Hoymann et al.

(10) Patent No.: US 9,204,455 B2
(45) Date of Patent: *Dec. 1, 2015

(54) AUTOMATIC GUARD PERIOD ADJUSTMENT IN TIME DIVISION DUPLEXED WIRELESS COMMUNICATION

(75) Inventors: Christian Hoymann, Aachen (DE); Jiansong Gan, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 28 days.

This patent is subject to a terminal disclaimer.

(21) Appl. No.: 13/816,354

(22) PCT Filed: Aug. 13, 2010

(86) PCT No.: PCT/CN2010/001226
§ 371 (c)(1),
(2), (4) Date: Feb. 11, 2013

(87) PCT Pub. No.: WO2012/019321
PCT Pub. Date: Feb. 16, 2012

(65) Prior Publication Data
US 2013/0136041 A1   May 30, 2013

(51) Int. Cl.
*H04L 12/28* (2006.01)
*H04L 12/56* (2006.01)
*H04W 72/08* (2009.01)
*H04J 3/16* (2006.01)
(Continued)

(52) U.S. Cl.
CPC .............. *H04W 72/082* (2013.01); *H04J 3/16* (2013.01); *H04W 24/02* (2013.01); *H04W 72/042* (2013.01); *H04W 72/0413* (2013.01); *H04W 72/0486* (2013.01)

(58) Field of Classification Search
CPC .................................. H04J 3/16; H04W 24/02
USPC .............. 370/276, 345, 395.4, 503, 241, 328, 370/465
See application file for complete search history.

(56) References Cited

U.S. PATENT DOCUMENTS 5,689,502 A   11/1997   Scott
6,347,113 B1   2/2002   Hatch
(Continued)

FOREIGN PATENT DOCUMENTS

CN   1358039 A   7/2002
CN   1592147 A   3/2005
(Continued)

OTHER PUBLICATIONS

WO2008/103090.*
(Continued)

*Primary Examiner* — Chuong T Ho
(74) *Attorney, Agent, or Firm* — Coats & Bennett, PLLC (57) ABSTRACT

The present invention is directed to methods for adjusting a guard period in a cellular wireless communication system, to a base station adapted to adjust a guard period, and to a network management entity for adjusting a guard period. One method comprises the steps: obtaining (S1) an indication of at least one downlink frame for an interference measurement; transmitting (S2) during the at least one indicated downlink frame an interference signal; measuring (S3) interference at least during a part of the guard period succeeding the indicated downlink frame; and setting (S4) at least one of an end time of at least one subsequence.

21 Claims, 5 Drawing Sheets

(51) Int. Cl.
*H04W 24/02* (2009.01)
*H04W 72/04* (2009.01)

(56) References Cited

U.S. PATENT DOCUMENTS

| | | | |
|---|---|---|---|
| 6,944,449 B1* | 9/2005 | Gandhi et al. | 455/425 |
| 8,085,721 B2* | 12/2011 | Ylitalo | 370/329 |
| 8,086,768 B2 | 12/2011 | Watanabe et al. | |
| 8,509,122 B2* | 8/2013 | Astely et al. | 370/276 |
| 8,537,688 B2* | 9/2013 | Astely et al. | 370/241 |
| 8,861,343 B2* | 10/2014 | Yang et al. | 370/229 |
| 8,982,892 B2 | 3/2015 | Gan et al. | |
| 2002/0071415 A1 | 6/2002 | Soulabail et al. | |
| 2003/0026215 A1 | 2/2003 | Schafer | |
| 2003/0156594 A1 | 8/2003 | Trott et al. | |
| 2005/0074067 A1 | 4/2005 | Nieto et al. | |
| 2005/0192011 A1* | 9/2005 | Hong et al. | 455/440 |
| 2006/0068715 A1 | 3/2006 | Hundal et al. | |
| 2006/0068717 A1* | 3/2006 | Gandhi et al. | 455/67.13 |
| 2007/0149242 A1 | 6/2007 | Kim et al. | |
| 2008/0080448 A1* | 4/2008 | Rottinghaus | 370/342 |
| 2008/0248796 A1 | 10/2008 | Oh et al. | |
| 2009/0279457 A1 | 11/2009 | Lucas et al. | |
| 2010/0097964 A1 | 4/2010 | Astely et al. | |
| 2010/0208675 A1* | 8/2010 | Song et al. | 370/329 |
| 2010/0210214 A1 | 8/2010 | Pawar et al. | |
| 2010/0284289 A1 | 11/2010 | Suo et al. | |
| 2010/0311452 A1* | 12/2010 | Li et al. | 455/509 |
| 2011/0002270 A1 | 1/2011 | Himayat et al. | |
| 2011/0222524 A1* | 9/2011 | Thomson et al. | 370/339 |
| 2011/0230187 A1* | 9/2011 | Jeon et al. | H04B 7/2606 455/434 |

FOREIGN PATENT DOCUMENTS

| | | |
|---|---|---|
| CN | 101399628 A | 4/2009 |
| CN | 101425839 A | 5/2009 |
| CN | 101631316 A | 1/2010 |
| EP | 1213855 A1 | 6/2002 |
| EP | 1619814 A1 | 1/2005 |
| EP | 1511190 A1 | 3/2005 |
| WO | 9732444 A1 | 9/1997 |
| WO | 0209312 A2 | 1/2002 |
| WO | 03043237 A1 | 5/2003 |
| WO | 2004004140 A2 | 1/2004 |
| WO | 2008088255 A1 | 7/2008 |
| WO | 2008103090 A1 | 8/2008 |
| WO | 2009059555 A1 | 5/2009 |
| WO | 2012019327 A1 | 2/2012 |

OTHER PUBLICATIONS

WO2008/088255.*
U.S. Appl. No. 61/313,881, filed Mar. 15, 2010.*
International Search Report for PCT/CN2010/001226 mailed May 26, 2011.
Mitsubishi Electric, "Idle Period Shortening for Half Duplex Communications in Large Cells", TSG RAN WG1, Oct. 10, 2005, pp. 1-7, R1-051180, XP003019664, 3GPP, San Diego, California, USA.
International Search Report for PCT/CN2010/001416 mailed May 26, 2011.

* cited by examiner

AUTOMATIC GUARD PERIOD ADJUSTMENT IN TIME DIVISION DUPLEXED WIRELESS COMMUNICATION

TECHNICAL FIELD

The present invention relates to a method for adjusting a guard period in a cellular wireless communication system, to a base station adapted to adjust a guard period, to a network management entity for adjusting a guard period, and to a computer program product which implements the methods.

BACKGROUND

Time division duplex (TDD) wireless networks, such as Long Term Evolution TDD networks (LTE TDD), use a guard period (GP) between downlink (DL) and uplink (UL) transmission periods. In LTE, transmissions are subdivided into radio frames (10 ms) and subframes (1 ms). In TDD mode, subframes are dedicated to UL transmission, to DL transmission or a subframe is used to transit from DL to UL. In the latter case, the subframe is called special subframe and it starts with a part for downlink transmission, called DwPTS. DwPTS is followed by the guard period, which is followed by a part for uplink transmission, called UpPTS. In the following, DL transmission periods, i.e., DL subframes and DwPTS, are simply called DL frames and UL transmission periods, i.e., UL subframes and UpPTS, are simply called UL frames. In a cellular system, the downlink refers to a communication from a base station (also referred to as eNB) of a cell to user equipment (UE), e.g. a mobile terminal; whereas the uplink refers to a communication from the user equipment to the base station.

In TDD, a base station of one cell in a cellular wireless communication system potentially interferes with a base station of another cell. For example, the signal transmitted by a base station of one cell during a downlink frame may interfere with a signal received at another base station of a neighboring cell during an uplink frame. This type of interference is also known as inter base station interference (eNB-eNB interference). In order to mitigate inter base station interference TDD networks are usually synchronized, so that DL transmissions and UL transmissions in different cells occur at the same time. However, due to the propagation delay of the transmission from one base station to another inter base station interference may even occur in synchronized networks during the uplink frame following the downlink frame during which the transmission took place.

The guard period needs to be large enough to avoid interference during the uplink frame of neighboring base stations. However, the guard period takes away resources for the transmission of payload data, i.e. the time resource. Therefore, a guard period which is as short as possible would improve the efficient usage of the time resource. In general, a minimum length of a guard period would improve performance of the wireless system.

Let us assume that a base station sends data during the entire downlink frame. Then, to be able to receive all data transmitted during the downlink frame, the user equipment needs to account for the propagation delay from the base station to the user equipment, i.e. the user equipment needs to stay in receive mode after the end time of the downlink frame has been reached for a further time period covering at least the propagation delay from the base station to the user equipment.

This propagation delay from the base station to the user equipment is denoted by $T_{prop}^{eNB-UE}$. The user equipment requires a certain switching time $T_{switch}^{UE}$ to switch from a receive mode to a transmit mode. Assuming, that the channel remains reciprocal, the propagation delay for transmissions from the user equipment to the base station will also be $T_{prop}^{eNB-UE}$. To be able to receive by the user equipment all data transmitted in the downlink frame and by taking into account the effect of switching time at the user equipment and the propagation delay the guard period must have the minimum duration of $$GP_{min}=2*T_{prop}^{eNB-UE}+T_{switch}^{UE}.$$

A guard period between downlink frames and uplink frames which is determined according to this formula does not take the effect of interference between neighboring base stations into account. This kind of interference can be severe since base station transmit power is usually high and base station to base station (eNB-eNB) radio channels might have good propagation conditions due to large antenna gains and possible line-of-sight conditions resulting, for example, from above roof-top deployment of base stations. Thus, the uplink frame may strongly be affected by this kind of interference which may significantly reduce the system's performance.

Besides accounting for the transmission delays and switching times, it would be desirable that the guard periods also helps to avoid occurrence of inter base station interference in the uplink frame. Direct inter base station interference (eNB-eNB interference) could only be mitigated entirely if the guard period would cover the inter base station signal propagation delay from the most distant eNB of the network. Such a large guard period however would degrade the system's performance.

A typical way to determine a guard period between a downlink frame and an uplink frame in a TDD cellular wireless communication system is to rely on experience of system designers. The system designer uses his experience to configure the guard period manually.

SUMMARY

Consequently, the invention focuses on the problem of how to obtain an optimal guard period. A further focus of the invention is the configuration of guard periods in an automatic, self-optimized way, i.e. such that the usage of experience and manual configuration by a system designer is not required anymore.

According to an aspect of the invention, a method for operating a base station to adjust a guard period in a cellular wireless communication system is provided. The communication system has a time division duplex mode comprising a downlink frame followed by the guard period followed by an uplink frame. The method comprises the following steps: obtaining an indication of at least one downlink frame for which an interference measurement shall take place; transmitting during the at least one indicated downlink frame an interference signal; measuring interference at least during a part of the guard period succeeding the indicated downlink frame; and setting at least one of an end time of at least one subsequent downlink frame and a start time of at least one subsequent uplink frame in dependence of the measured interference.

By setting of the at least one of the end time and the start time the guard period can be adjusted. Both the duration and a position of the guard period can be adjusted.

According to an aspect of the invention, a method for adjusting a guard period in a cellular wireless communication system is provided. The communication system has a time division duplex mode comprising a downlink frame followed by the guard period followed by an uplink frame. The method comprises the following steps: indicating at least one downlink frame for an interference measurement; receiving at least one measurement result of the interference measurement; determining at least one of an end time of at least one subsequent downlink frame and a start time of at least one subsequent uplink frame in dependence on the at least one measurement result; and reconfiguring at least one of the end time of the subsequent downlink frame and the start time of the subsequent uplink frame in the cellular wireless communication system according to the at least one determined value. The method may run in a network management entity, such as an Operating Support System (OSS).

According to an aspect of the invention a base station adapted to adjust a guard period in a cellular wireless communication system having a time division duplex mode comprising a downlink frame followed by the guard period followed by an uplink frame is provided. The base station comprises: a receiver for obtaining an indication of at least one downlink frame for which an interference measurement shall take place; a transmitter for transmitting during the at least one indicated downlink frame an interference signal; measuring equipment for measuring interference at least during a part of the guard period succeeding the indicated downlink frame; and setter for setting at least one of an end time of at least one subsequent downlink frame and a start time of at least one subsequent uplink frame in dependence of the measured interference.

According to one aspect of the invention, a network management entity for adjusting a guard period in a cellular wireless communication system having a time division duplex mode comprising a downlink frame followed by the guard period followed by an uplink frame is provided. The entity comprises: an indicator for indicating at least one downlink frame for an interference measurement; a receiver for receiving at least one measurement result of the interference measurement; a determinator for determining at least one of an end time of at least one subsequent downlink frame and a start time of at least one subsequent uplink frame in dependence on the at least one measurement result; and a configurator for reconfiguring the at least one of an end time of the subsequent downlink frame and a start time of the subsequent uplink frame in the cellular wireless communication system according to the at least one determined value.

According to one aspect of the invention a computer program product is provided comprising software code portions for performing the methods for adjusting a guard period according to the above methods, when the product is run on a processor.

Further embodiments of the invention are also defined in the dependent claims.

DETAILED DESCRIPTION

In the following, preferred embodiments of the invention will be described with reference to the figures. It is noted that the following description contains examples that serve to better understand the claimed concepts, but should not be construed as limiting the claimed invention.

Figure 1:
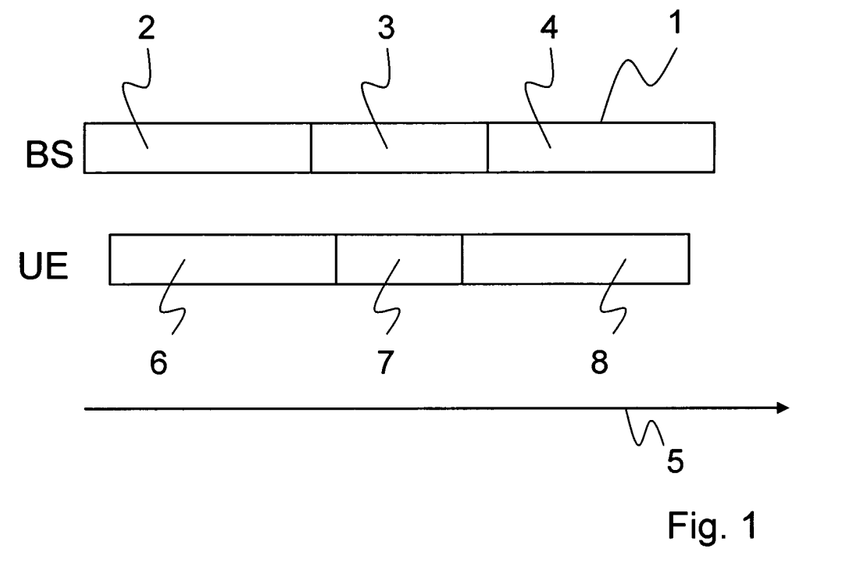
FIG. 1 shows a frame structure at a base station and a user terminal in a TDD wireless communication system with respect to a time line.

FIG. 1 depicts a frame structure for a TDD cellular system from a perspective of a base station BS and also of user equipment UE with regard to a time line 5. The frame structure 1 comprises a downlink frame 2, a guard period 3 and an uplink frame 4, which are separated by boundaries. During the downlink frame 2, the base station BS transmits data to the user equipment UE. During the uplink frame 4 the base station receives data from the user equipment UE. During the guard period 3 the base station does neither transmit data to the user equipment UE nor receive data from the user equipment UE.

The user equipment UE receives the data transmitted in the downlink frame 2 during a received downlink frame 6. Due to a propagation delay caused by the wireless channel between the base station and the user equipment UE, the received downlink frame 6 shows, with regard to the time line 5, changed boundaries compared to the boundaries of the downlink frame 6. During a switching period 7, the user equipment UE switches from a receiving mode to a transmitting mode. During a subsequent user equipment uplink frame 8, the user equipment transmits data to the base station.

The data transmitted during the user equipment uplink frame 8 is received at the base station BS during the uplink frame 4. Due to a propagation delay between the user equipment and the base station, the boundaries of the uplink frame 4 are altered compared to the boundaries of the user equipment uplink frame 8.

To enable that the user equipment UE receives all the data transmitted from the base station during downlink frame 2 and by talking into account that the user equipment requires switching time to switch from receive to transmit mode and that there is a propagation delay between the base station and the user equipment, the minimum duration of the guard period 3 between the downlink frame 2 and the uplink frame 4 is determined by adding the switching duration, the propagation delay from the base station to the user equipment, and the propagation delay between the user equipment and the base station.

The propagation delay is usually determined on the basis of the maximum cell size supported by a cellular network. A certain margin can be added to the determined guard period to account for special effects such as handover or user equipment being in a handover region of a cell.

Figure 2:
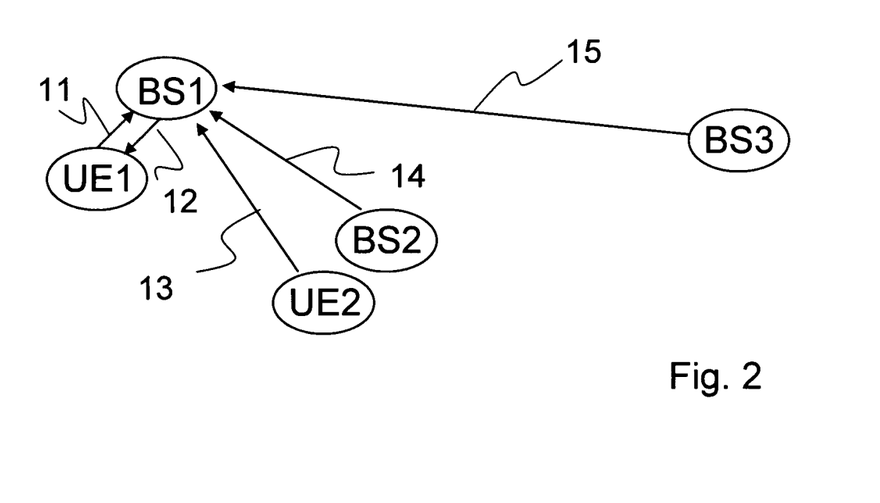
FIG. 2 shows an interference situation in a cellular wireless communication system.

FIG. 2 shows an interference situation in an exemplary cellular wireless communication system having three cells. Each cell is served by one of the base stations BS1, BS2, and BS3. User equipment UE1 belongs to base station BS1, i.e. is served by the base station BS1, user equipment UE2 belongs to base station BS 2. All base stations BS1, BS2 and BS3 use the frame structure as discussed above with respect to FIG. 1. The frame structure comprises a downlink frame, a guard period and an uplink frame. The start time of the frame structure is identical for every base station BS1, BS2 and BS3.

During the downlink frame, base station BS1 transmits a signal 12 to user equipment UE1, BS2 transmits a signal 14 to the user equipment UE2 and BS3 transmits a signal 15 to the user equipment in its cell. Signal 14 of base station BS2 and signal 15 of base station BS3 cause also interference at base station BS1 due to propagation delay. The interference occurs in the guard period and in the uplink frame of base station BS1 following the downlink frame, in which signals 12, 14 and 15 have been transmitted. This kind of interference can be severe since the transmit power of base stations is usually high compared to the transmit power of the user equipment. Furthermore, radio channels between a first and a second base station might have good propagation conditions due to large antenna gains and line-of-sight situations which result from above roof-top deployment.

While the interference during the guard period does not reduce the system performance, the interference in the uplink frame may significantly decrease the quality of the signals received in the uplink frame of the base station. According to the invention, the duration of the guard period between the downlink frame and the uplink frame is set to limit the effect of interference in the uplink frame. The guard period can be changed by either changing the boundary between the downlink frame and the guard period and/or by changing the boundary between the guard period and the uplink frame.

An optimal guard period duration depends on the network deployment comprising at least one of a distance between a first and a second base station, site selection, antenna downtilt, transmit power and system load and also on the level of acceptable base station to base station interference. The propagation delay between a first and a second base station is denoted by $T_{prop}^{eNB-eNB*}$; The guard period duration to remove interference from the second base station at the first base station is thus $$GP2 = T_{prop}^{eNB-eNB*}.$$

In addition, the user equipment UE2 that belongs to base station 2 causes interference at the base station BS1. As user equipment UE2 will transmit during its uplink frame it will cause interference at BS1 during the guard period and/or uplink frame of base station BS2.

Figure 3:
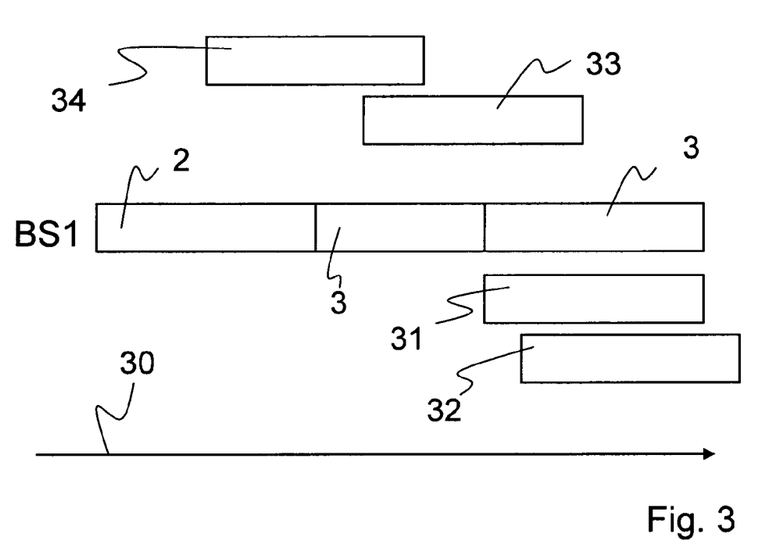
FIG. 3 shows an interference situation with regard to particular frames at a base station side.

FIG. 3 shows the interference situation depicted in FIG. 2 with regard to the respective frames received at the base station BS1. The frame structure at BS1 comprises the downlink frame 2, the guard period 3 and the uplink frame 4, which is depicted with regard to the time line 30. The downlink frames of base stations BS2 and BS 3 have the same time alignment as the base station BS1. Due to propagation delay, the interfering downlink frame 34 transmitted by base station BS2 interferes with the frame structure of BS1 as shown. Also the interfering downlink frame 33 of base station BS3 and the interfering uplink frame 32 of user equipment UE2 are depicted. The received uplink frame 31 of UE1 coincides with the uplink frame of BS1.

Figure 4:
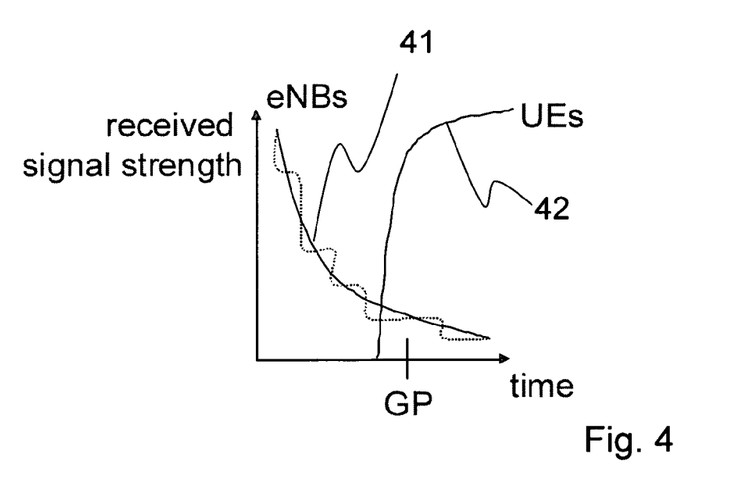
FIG. 4 shows received signal strength as a function of time during a measurement period.

FIG. 4 shows received signal strength as a function of time during a measurement period which covers the guard period and the uplink frame at a base station that suffers from interference. The curve 41 gives a received signal strength resulting from interference from other base stations, e.g. from the frames 33 and 34 in FIG. 3. The curve 42 gives the signal strength of received uplink frames, e.g. frames 31 and 32 in FIG. 3.

The first guard period duration GP1 covering the effects of propagation delay between base station and user equipment and the switching time in the user equipment from receive mode to a transmit mode can be determined from base station (eNB) coordinates or from maximum timing advancement commands, which determine the maximum cell size.

The second guard period duration GP2 shall cover the effect of inter base station interference (eNB-eNB interference) between downlink and uplink frames/subframes. These frames are called DwPTS and UpPTS in LTE. To optimally determine the second guard period, the inter base station interference is measured. For the measurement, it is favorable that a typical operating point (e.g., operating point at a typical network load) is created or actually present in the cellular wireless communication system.

In FIG. 4 two different kinds of signals which are received by a base station (eNB) between downlink and uplink frames are depicted. Curve 41 results from base station (eNB) transmissions during a downlink frame station, i.e. the downlink frame preceding the guard period during which the measurement takes place. This curve is degrading either continuously, e.g. when non line of sight (NLOS) situations are dominant or step-wise when strong line of sight components are present. Curve 42 results from signals from user equipment (UEs) scheduled in the uplink subframe following the guard period under consideration. This curve 42 is increasing once the UEs start transmitting.

In order to measure direct inter base station interference (eNB-eNB interference) at a typical operating point a certain network load can be configured. Hence, a network wide coordinated downlink frame with a certain load has to be configured to create a well defined interference situation in the network. In order to model the worst case scenario, all base station (eNBs) will transmit with full power. In practice, a medium load of, for example, around 60% seems to be more reasonable. It might be reasonable to configure such measurements localized in certain regions of the network instead of in the entire network wide.

User equipment signals potentially disturb the measurements, as can be seen from FIG. 4. This interference can be avoided, when the UEs are muted during the measurement interval. Hence, a network wide coordinated empty uplink frame without any UE traffic can be configured to allow for disturbance-free measurements. UE traffic contains scheduled data, e.g. PUSCH (Physical Uplink Shared Channel), as well as control messages, e.g. PUCCH (Physical Uplink Control channel), RACH (Random Access Channel), SRS (Sounding Reference Signal), etc. In LTE Release 8, the UpPTS contains SRS and RACH only. Furthermore, the empty UL subframe improves the measurement in an extended duration of the measurement interval, which is longer than the actually configured guard period.

Measurements should start at a predefined time reference point. One choice would be to start eNB (eNodeB) measurements a pre-defined time after the end time of the downlink subframe. The pre-defined time can be the maximum switching time for base stations (eNBs) from transmit mode to receive mode (Tx-Rx) which is 17 μs in LTE, see 3GPP TS 36.104. The maximum switching time allows Tx-Rx switching at the base station. The timing of the downlink subframe (e.g. DwPTS size), which is known to the system, could be used to combine measurements of different eNBs with potentially different start times. The timing accuracy of synchronized TDD networks could be considered as well.

Figure 5:
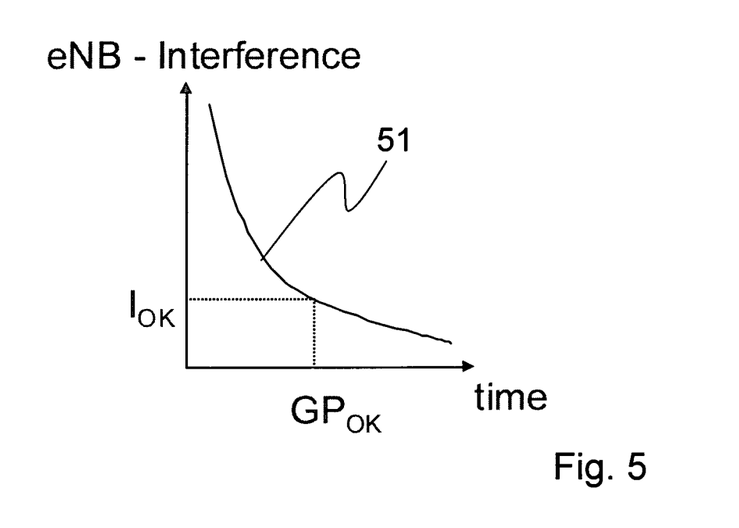
FIG. 5 shows base station (eNB) interference as a function of time.

FIG. 5 shows base station interference (eNB interference) as function of time. After the base stations are configured in the above discussed way, the direct eNB-eNB interference is measured by each eNB. The measurement result is depicted as curve 51 in FIG. 5.

An interference level is acceptable if it is below a certain threshold, which is, for example, set in a way that signal quality degradation due to interference is below a certain level. By using the measurement, i.e. curve 51, from the acceptable interference level $I_{OK}$ the corresponding guard period duration $GP_{OK}$ can be obtained, see FIG. 5. Measurements could be based on total received energy. Alternatively, a pre-defined training sequence could be transmitted and detected by eNBs. Regular training signals (reference signals) can be used as well.

If the measurements are performed using artificial interference signals, one downlink subframe and one uplink subframe can not be used to serve user equipments (UEs). To reduce this impact, measurements should be performed during low-load situations in the network, e.g. during the night. Alternatively, the interference signal generated by base stations could be composed of useful signals, such as payload data or control signalling. In that case only one uplink subframe cannot be used. A mixture of useful and artificial interference signals is also possible.

Either the entire measurement (curve 51) or the GP duration $GP_{OK}$ may be send to the network management entity, for example the Operating Support System (OSS). The management entity then chooses the optimal guard period on the basis of GP1 and $GP_{OK}$, wherein GP1 covers the effect of propagation delay between base stations and user equipment and the switching from receive to transmit mode of the user equipment and $GP_{OK}$ covers the effect of inter base station interference.

The optimal guard period $GP_{opt}$ covering both effects can be determined from the GP1 as well as from the maximum guard period of the multiple guard periods $GP_{OK}$ as reported by multiple eNBs:

$$GP_{opt}=\max\{GP1,\max\{GP_{OK}\}\}.$$

In LTE the duration of the sum of the guard period duration between the downlink frame and the uplink frame and the guard period duration between the uplink frame and the downlink frame has to be an integer multiple of an OFDM symbol duration.

The described method can also be carried out if the measurement results are not collected at a central management entity, such as an Operating Support System, but if they are locally exchanged between base stations in a distributed manner. In this case, the optimal guard period $GP_{opt}$ is calculated by each base station.

The base stations are then (re-)configured with the optimal guard period $GP_{opt}$. The guard period $GP_{opt}$ can be identical in the entire network or can be different from base station to base station or from a subregion of the network to another subregion of the network. A subregion may comprise multiple base stations.

When the duration of the guard period is modified either the duration of the uplink frame or the duration of the downlink frame or both are to be changed. In case of fixed start time and fixed end time of a frame structure comprising downlink frame, guard period and uplink frame, the duration of the downlink frame can be altered by altering the end time of the downlink frame and the uplink frame duration can be altered by changing the start time of the uplink frame.

If the duration of the downlink subframe, e.g. DwPTS, is changed the eNB-eNB interference situation changes and thus new measurements are reasonable. However, ping-pong situations, in which the downlink subframe duration is enlarged due to a first measurements, reduced due to a second measurements, enlarged due to a third measurement and so on are to be avoided. Basically continued increase and decrease of the downlink subframe duration should be avoided. The extra measurement due to alteration of the downlink subframe duration or of the end time of the downlink subframe is not necessary if only the uplink subframe duration or the start time of the uplink subframe is modified.

The method allows optimally configuring the guard period in TDD networks. The algorithm can be automated leading to self-optimizing TDD networks. With optimized guard period durations, network capacity can be maximized and network disturbance can be minimized.

Figure 6:
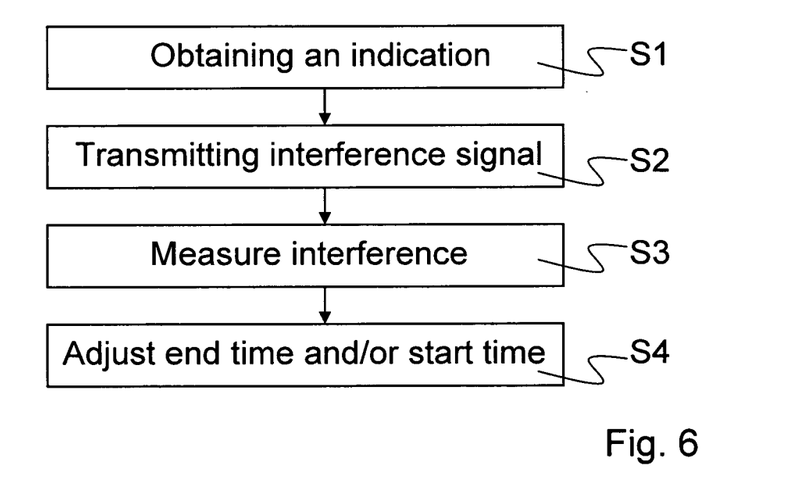
FIG. 6 shows a float chart of a method to adjust guard periods which runs in a base station according to one embodiment.

FIG. 6 shows a float chart of a method to adjust guard periods which runs in a base station according to one embodiment (best mode). The base station may be part of a cellular wireless communication system having a time division duplex mode. According to the duplex mode, a frame structure comprises a downlink frame followed by the guard period followed by an uplink frame. According to step S1, the base station obtains an indication of a downlink frame for an interference measurement. In step S2, the base station transmits during the indicated downlink frame an interference signal. The transmitted interference signal can be used by other base stations to measure interference at the respective other base station. In step S3, the base station measures interference, wherein the measurement begins in the guard period, which directly follows the indicated downlink frame. During the measurement the base station will probably receive interference signals transmitted from base stations, which are in the neighborhood. In step S4, the base station will adjust future guard periods by setting an end time of subsequent downlink frames or a start time of subsequent uplink frames or both.

The selected start times and end times depend on the measured interference. The actual computation of the start time and the end time can be performed in the base station, in a central network entity or also in a distributed manner, wherein different nodes in the network are involved in the process of determining optimal values for the end time of future downlink frames and the start time of future uplink frames.

In the described method the guard period between the downlink frame and the uplink frame is adjusted automatically in an optimal manner. Note that not only the duration of the guard period is changeable by the method but also the concrete placement in the frame structure, as both start time and end time of the guard period can be separately adjusted.

To avoid that the interference measurement is negatively affected by user equipment that transmit in the uplink frame directly following the downlink frame in which the interference signal is transmitted, it is favorable to avoid that user equipment will transmit during the said uplink frame. This can be achieved by a corresponding request transmitted from the base station to the respective user equipment.

The measured interference can be compared with a threshold value reflecting an acceptable level of interference, i.e. the signal degradation due to interference remains under a certain level.

The measurement result, e.g. the measured interference level or the optimal guard period duration, or alternatively the start and end time of the future guard periods can be transmitted to another entity. The mentioned time values may be obtained by a comparison of the measured interference with a threshold value. In this entity, e.g. a network management entity or another base station the respective measurement result is used to determine an optimal adjustment of the guard period. In case the base station has not computed optimal values for the start and end time of the guard period by itself it may receive the values from another node in the network in which this computation took place.

The adjustment of the guard period takes the measured interference situation at one or more base stations into account. It may also be optimized by taking further parameters into account. Such parameters are for example cell size, propagation delay between base stations and user equipment, and switching time of a user equipment between receive mode and transmit mode.

The interference signal transmitted by the base station during the indicated downlink frame may depend on a selected load for the cells. For example, if it is assumed that the load of a base station is 60 percent of maximum load then the interference signal is selected accordingly. In case maximum load is assumed than another test signal is selected as interference signal. In the latter case the interference signal may have higher energy.

In case the end time of the downlink frame is adjusted, the interference situation in the cell and also in the network will be altered. In this case it would be reasonable to re-do the method of adjusting the guard period to cover the effect of inter base station interference. In one embodiment, it is preferred to only allow changing the start time of the uplink frame, such that the re-doing of the method can be avoided.

The measuring period may start in the guard period directly following the indicated downlink frame as soon as the base station has switched from transmit mode to receive mode. The measuring period can end in the guard period or in the following uplink frame. Maybe even in the guard period following this uplink frame.

Figure 7:
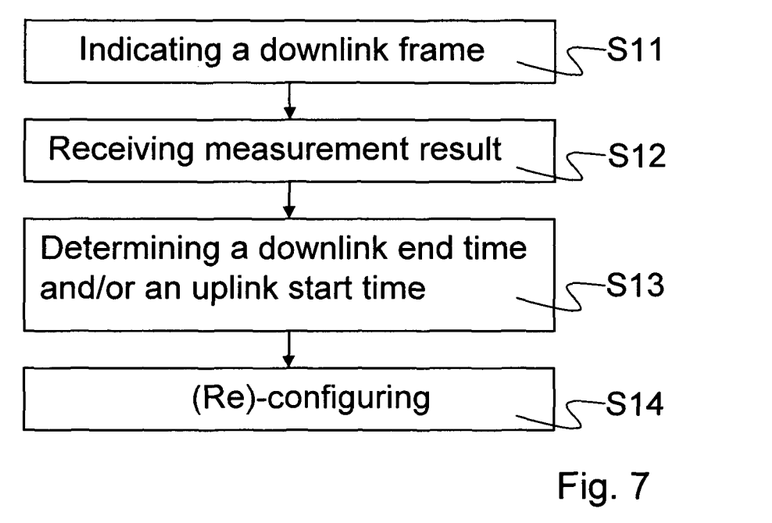
FIG. 7 shows a float chart of a method that runs in a network management entity according to one embodiment.

FIG. 7 shows a float chart of a method for adjusting a guard period according to a preferred embodiment. The method is carried out in a network management entity. The network entity may be part of a cellular wireless communication system having a time division duplex mode. According to the duplex mode, a frame structure comprises a downlink frame followed by the guard period followed by an uplink frame. According to step S11, the network management entity indicates to a base station at least one downlink frame for an interference measurement. The base station will use the indicated downlink frame for transmitting an interference signal, which is preferably selected in dependence of a configured network load. Based on the interference signals the base stations will perform interference measurements and transmit their measurement results to the network entity.

In step S12, the network management entity receives a measurement result of the interference measurement carried out at the base station. In step S13, based on the received results, the network management entity determines an end time of subsequent downlink frames and a start time of subsequent uplink frames in dependence on the measurement result(s). The network entity will usually receive measurement results of multiple base stations and compute the start and end time of future guard periods based on the measurement results. In step S14, the network entity will reconfigure the end time of subsequent downlink frames or the start time of subsequent uplink frames or both. The reconfiguration takes place at one base station at an entire network or in a certain region or subentity of a network.

The determination of the optimal adjustment of future guard periods may also depend on further parameters, such as cell size and switching time of user equipment from receive mode to transmit mode. The load of the network or a particular cell, e.g. the traffic in the network or the number of active users in a cell, may be configured for reasonable interference measurements. A suited interference signal can be determined on the basis of the actually configured load. In case, the network entity will change the end time of the downlink frame, it would be reasonable to redo the method. In one embodiment, it is preferred to only allow changing the start time of the uplink frame, such that the re-doing of the method due to altered interference situations can be avoided.

Figure 8:
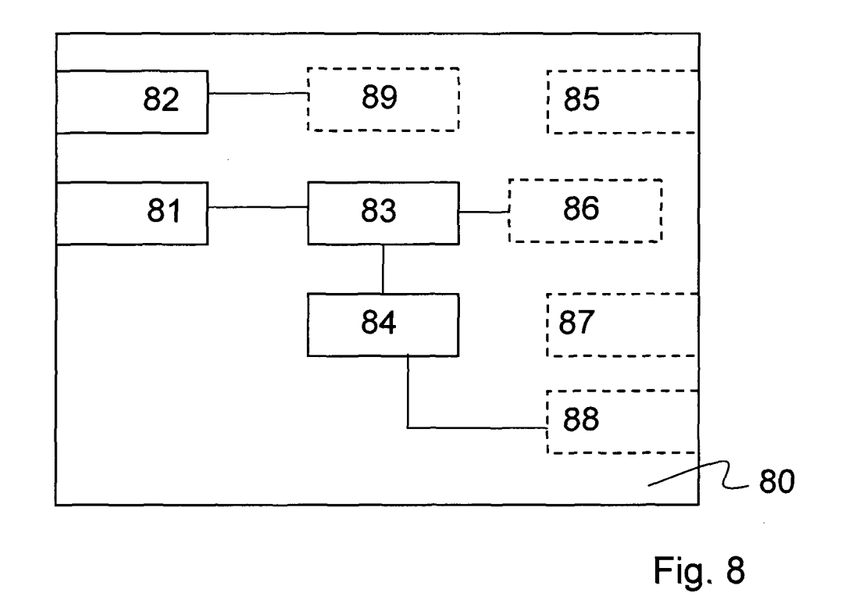
FIG. 8 shows a base station according to one embodiment.

FIG. 8 shows a base station 80 according to one embodiment. The base station 80 comprises a receiver 81 for obtaining an indication of a downlink frame measurement, a transmitter 82 for transmitting an interference signal, measuring equipment 83 for measuring interference, and a setter or controller 84 for setting an end time of a downlink frame and/or a start time of an uplink frame. The receiver 81 may obtain the indication from a network management entity 90 (FIG. 9), such as an OSS. The receiver 81 may also receive interference signals which are used by the measuring equipment 83 to measure the interference. Of course, the receiver may also belong to the measurement equipment 83. The measurement results are sent to the controller 84, which determines based on the results an uplink start time and/or a downlink end time and also sets the respective values at the base station 80 for future transmissions.

Figure 9:
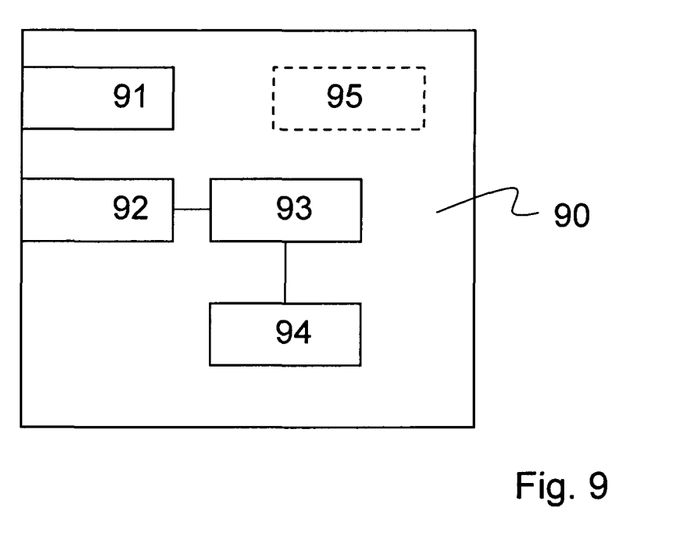
FIG. 9 shows a network management entity according to one embodiment.

The base station 80 optionally comprises a transmitter 85 for transmitting a request to its user equipment to not transmit data which could harm the interference measurement. The base station 80 may comprises a comparator 86 for comparing a measured interference with a threshold value. The comparator 86 receives the measured interference from the receiver 81 or the measurement equipment 83. The comparator 86 may also be part of the measurement equipment 83. The result of the comparison can be regarded as a measurement result which is sent to the controller 84. The base station optionally comprises a transmitter 87 for transmitting at least one measurement result. The measurement results can also be transmitted to another device, such as the network management entity 90 (FIG. 9). The base station 80 may also comprise a receiver 88 for receiving a setting of an end time of a downlink frame and a start time of an uplink frame. The received setting can be transferred to the controller 84, which actually sets the respective times at the base station. The base station 80 may further comprise a determinator 89 for determining the interference signal. The determined or selected interference signal can be transmitted via the transmitter 82. Of course all receivers and transmitters can be merged in one receiving entity and transmitting entity, respectively. The base station 80 as well as the entities comprised by the base station 80 may be adapted to perform the steps according to the above methods to adjust guard periods, which can be carried out in a base station.

FIG. 9 shows a network management entity 90 according to one embodiment. The network entity 90 comprises an indicator 91 for indicating a downlink frame, a receiver 92 for receiving a measurement result, a determinator 93 for determining an end time of downlink frame and/or a start time an uplink frame, and a configurator 94 for reconfiguring an end time of a downlink frame and/or a start time of an uplink frame. The network management entity may optionally comprise a configurator 95 for configuring a load of the network. The network management entity 90 as well as the entities comprised by the network management entity 90 may be adapted to perform the steps according to the above methods to adjust guard periods, which can be carried out in network management entity. The configurator 94 configures the end time of a downlink frame and/or a start time of an uplink frame according to the determined values of the determinator 93. The determinator 93 uses for the determination of these values the measurement results received via the receiver 92. The indicator 91 may transmit the indication to base stations managed by the network management entity 90.

With the invention the guard period is adjusted to reduce the influence of inter base station interference. The guard period is automatically adjusted in an optimal way, which takes into account the effects discussed above.

It is to be understood that base stations/eNBs can be all kinds of base stations/eNBs, such as macro-, pico-, femto-, or home base stations/eNBs. Furthermore, as relay nodes also serve their own cells, they are considered to be a base station/eNB within the scope of this invention disclosure.

The invention claimed is:

1. A method for operating a base station to adjust a guard period in a cellular wireless communication system having a time division duplex mode comprising a downlink frame followed by the guard period followed by an uplink frame, the method comprising:
   obtaining an indication of at least one downlink frame for an interference measurement;
   transmitting an interference signal during the at least one indicated downlink frame;
   measuring interference at least during a part of the guard period succeeding the indicated downlink frame;
   setting, based on the measured interference, at least one of:
      an end time of at least one subsequent downlink frame;
      a start time of at least one subsequent uplink frame;
   comparing the measured interference with a threshold value;
   wherein the setting comprises setting, based on the comparison of the measured interference with the threshold value, at least one of:
      the end time of the at least one subsequent downlink frame;
      the start time of the at least one subsequent uplink frame.

2. The method of claim 1, further comprising transmitting a request to user equipment requesting the user equipment not to use an uplink frame succeeding the indicated downlink frame for transmissions.

3. The method of claim 1, further comprising transmitting at least one measurement result to at least one of:
   another base station of the cellular wireless communication system;
   a network management entity of the cellular wireless communication system.

4. The method of claim 1, further comprising receiving, from at least one other base station and/or from a network management entity of the cellular wireless communication system, a setting of at least one of an end time of the subsequent downlink frame and a start time of the subsequent uplink frame.

5. The method of claim 1, wherein the setting comprises setting, based on the measured interference, the comparison of the measured interference with the threshold value, and a maximum cell size, at least one of:
   the end time of the at least one subsequent downlink frame;
   the start time of the at least one subsequent uplink frame.

6. The method of claim 1, further comprising determining the interference signal based on a configurable load in the wireless communication system.

7. The method of claim 1, wherein the measuring comprises measuring interference starting in the guard period and ending in the succeeding uplink frame.

8. A method for operating a base station to adjust a guard period in a cellular wireless communication system having a time division duplex mode comprising a downlink frame followed by the guard period followed by an uplink frame, the method comprising:
   obtaining an indication of at least one downlink frame for an interference measurement;
   transmitting an interference signal during the at least one indicated downlink frame;
   measuring interference at least during a part of the guard period succeeding the indicated downlink frame;
   setting, based on the measured interference, at least one of:
      an end time of at least one subsequent downlink frame;
      a start time of at least one subsequent uplink frame;
   re-doing the obtaining, the transmitting, the measuring, and the setting in response to the end time of the subsequent downlink frame being changed by the setting.

9. A method for adjusting a guard period in a cellular wireless communication system having a time division duplex mode comprising a downlink frame followed by the guard period followed by an uplink frame, the method comprising:
   indicating at least one downlink frame for an interference measurement;
   receiving at least one measurement result of the interference measurement;
   determining, based on the at least one measurement result, a determined value for at least one of:
      an end time of at least one subsequent downlink frame;
      a start time of at least one subsequent uplink frame;
   reconfiguring at least one of the end time of the subsequent downlink frame and the start time of the subsequent uplink frame based on the determined value.

10. The method of claim 9, wherein the determining comprises determining, based on the measurement result and a maximum cell size, the determined value for at least one of:
    the end time of the at least one subsequent downlink frame;
    the start time of the at least one subsequent uplink frame.

11. The method of claim 9:
    further comprising configuring a load in the cellular wireless communication system;
    determining an interference signal based on the configured load.

12. The method of claim 9, further comprising
    re-doing the indicating, the receiving, the determining, and the reconfiguring in response to the end time of the subsequent downlink frame being changed by the reconfiguring.

13. A base station adapted to adjust a guard period in a cellular wireless communication system having a time division duplex mode comprising a downlink frame followed by the guard period followed by an uplink frame, the base station comprising:
    a receiver configured to obtain an indication of at least one downlink frame for an interference measurement;
    a transmitter configured to transmit an interference signal during the at least one indicated downlink frame;
    measuring equipment configured to measure interference at least during a part of the guard period succeeding the indicated downlink frame;
    processing circuitry configured to set, based on the measured interference, at least one of:
       an end time of at least one subsequent downlink frame;
       a start time of at least one subsequent uplink frame;
    wherein the processing circuitry is further configured to compare the measured interference with a threshold value;
    wherein the processing circuitry is configured to set at least one of the end time and the start time based on the comparison of the measured interference with the threshold value.

14. The base station of claim 13, wherein the transmitter is further configured to transmit a request to user equipment requesting the user equipment not to use the uplink frame succeeding the indicated downlink frame for transmissions.

15. The base station of claim 13, further comprising a second transmitter configured to transmit at least one measurement result to at least one other base station and/or to a network management entity of the cellular wireless communication system.

16. The base station of claims 13, further comprising a second receiver configured to receive, from at least one other base station and/or from a network management entity of the cellular wireless communication system, a setting of at least one of:
    an end time of the subsequent downlink frame;
    a start time of the subsequent uplink frame.

17. The base station of claim 13, wherein the processing circuitry is further configured to determine the interference signal based on a configurable load.

18. A network management entity for adjusting a guard period in a cellular wireless communication system having a time division duplex mode comprising a downlink frame followed by the guard period followed by an uplink frame, the network management entity comprising:
    a transmitter configured to indicate at least one downlink frame for an interference measurement;
    a receiver configured to receive at least one measurement result of the interference measurement;
    processing circuitry configured to:
        determine, based on the at least one measurement result, a determined value for at least one of:
            an end time of at least one subsequent downlink frame;
            a start time of at least one subsequent uplink frame;
        reconfigure, based on the determined value, at least one of:
            the end time of the subsequent downlink frame;
            the start time of the subsequent uplink frame.

19. The network management entity of claim 18, wherein the processing circuitry is further configured to configure a load in the cellular wireless communication system, wherein the configured load is to be used for determining an interference signal.

20. A computer program product stored in a non-transitory computer readable medium for adjusting a guard period in a cellular wireless communication system having a time division duplex mode comprising a downlink frame followed by the guard period followed by an uplink frame, the computer program product comprising software instructions which, when run on a processor of a base station, causes the base station to:
    obtain an indication of at least one downlink frame for an interference measurement;
    transmit an interference signal during the at least one indicated downlink frame;
    measure interference at least during a part of the guard period succeeding the indicated downlink frame;
    compare the measured interference with a threshold value;
    set, based on the comparison of the measured interference with the threshold value, at least one of:
        an end time of at least one subsequent downlink frame;
        a start time of at least one subsequent uplink frame.

21. A computer program product stored in a non-transitory computer readable medium for adjusting a guard period in a cellular wireless communication system having a time division duplex mode comprising a downlink frame followed by the guard period followed by an uplink frame, the computer program product comprising software instructions which, when run on a processor of a network management entity, causes the network management entity to:
    indicate at least one downlink frame for an interference measurement;
    receive at least one measurement result of the interference measurement;
    determine, based on the at least one measurement result, a determined value for at least one of:
        an end time of at least one subsequent downlink frame;
        a start time of at least one subsequent uplink frame;
    reconfigure at least one of the end time of the subsequent downlink frame and the start time of the subsequent uplink frame based on the determined value.

* * * * *